United States Patent
Hwang

(10) Patent No.: US 8,675,052 B2
(45) Date of Patent: Mar. 18, 2014

(54) PIXEL CIRCUIT, DEVICE AND METHOD FOR DISPLAYING STEREOSCOPIC IMAGE

(75) Inventor: Young-In Hwang, Yongin (KR)

(73) Assignee: Samsung Display Co., Ltd., Gyeonggi-Do (KR)

(*) Notice: Subject to any disclaimer, the term of this patent is extended or adjusted under 35 U.S.C. 154(b) by 188 days.

(21) Appl. No.: 13/189,451

(22) Filed: Jul. 22, 2011

(65) Prior Publication Data
US 2012/0154380 A1 Jun. 21, 2012

(30) Foreign Application Priority Data
Dec. 16, 2010 (KR) .......................... 10-2010-0129235

(51) Int. Cl.
*H04N 13/04* (2006.01)
*H04N 9/64* (2006.01)
*H04N 13/00* (2006.01)
*G09G 3/30* (2006.01)
*G06T 15/00* (2011.01)

(52) U.S. Cl.
USPC ................... 348/51; 348/30; 348/42; 345/76; 345/419

(58) Field of Classification Search
USPC ................................ 348/42–60; 345/76, 419
See application file for complete search history.

(56) References Cited

U.S. PATENT DOCUMENTS

| 2007/0035493 | A1* | 2/2007 | Chang | .............................. | 345/87 |
| 2010/0026794 | A1* | 2/2010 | Chang | .............................. | 348/56 |
| 2011/0310234 | A1* | 12/2011 | Sarma et al. | .................... | 348/53 |

FOREIGN PATENT DOCUMENTS

| KR | 10-2007-0041177 A | 4/2007 |
| KR | 10-2010-0017725 A | 2/2010 |
| KR | 10-2010-0056361 A | 5/2010 |
| WO | WO 2010/058954 A2 | 5/2010 |

* cited by examiner

*Primary Examiner* — Dave Czekaj
*Assistant Examiner* — Tsion B Owens
(74) *Attorney, Agent, or Firm* — Knobbe Martens Olson & Bear LLP

(57) ABSTRACT

A stereoscopic image display device is disclosed. According to one aspect, the stereoscopic image display device includes a display panel, a timing controller, a data driver, and a gate driver. The timing controller alternately outputs a left frame image signal and a right frame image signal, and outputs a plurality of first and second control signals. The data driver drives the data lines in response to the left frame image signal, the right frame image signal and the first control signals. The gate driver drives the gate lines and outputs a transfer signal in response to the second control signals. Each of a plurality of pixels includes a first transistor, a hold capacitor, a second transistor, a storage capacitor, and a liquid crystal capacitor. The first transistor is connected between a corresponding data line and a first node, and has a gate connected to a corresponding gate line. The hold capacitor is connected between the first node and a ground voltage. The second transistor is connected between the first node and a second node, and has a gate configured to receive the transfer signal. The storage capacitor is connected between the second node and the ground voltage. The liquid crystal capacitor is connected between the second node and the ground voltage.

15 Claims, 7 Drawing Sheets

PIXEL CIRCUIT, DEVICE AND METHOD FOR DISPLAYING STEREOSCOPIC IMAGE

CROSS-REFERENCE TO RELATED APPLICATIONS

This U.S. non-provisional patent application claims priority under 35 U.S.C. §119 of Korean Patent Application No. 10-2010-0129235, filed on Dec. 16, 2010, the entire contents of which are hereby incorporated by reference.

BACKGROUND

1. Field

The disclosed technology relates to a stereoscopic image display device.

2. Description of the Related Technology

With the recent advancements in digital display technology, display devices are capable of providing a high-quality image on a relatively large screen. Additionally, display devices are capable of displaying a stereoscopic image exhibiting realistic effects, thereby satisfying various display sensory demands of viewers of the displayed media.

Generally, display devices for displaying stereoscopic images of an object in three-dimensions do so by using binocular parallax. Binocular parallax is generally regarded as the most significant factor for recognizing a displayed image in three-dimensions. In order to achieve this effect, display devices use a scheme that spatially separates left and right images with an optical device, thereby enabling the display of a stereoscopic image.

Since stereoscopic image display devices divide an image into a left frame image corresponding to a left eye and a right frame image corresponding to a right eye, they require a driving speed faster than that of general display devices. In order to reduce or remove the effect of cross-talk, which may result from a difference between the response time of the liquid crystal display and the rate at which image data is input to the display, a black image may be inserted to both images. When inserting a black image into the images, stereoscopic display devices require a faster driving speed. As a result, brightness of the displayed image is reduced.

SUMMARY OF CERTAIN INVENTIVE ASPECTS

The disclosed embodiments relate to a pixel circuit, a stereoscopic image display device and a display method thereof, which display a high-quality stereoscopic image at a low driving speed.

According to one aspect, a stereoscopic image display method of a display device is disclosed. The display device includes a plurality of left frame pixels for displaying a left frame image and a plurality of right frame pixels for displaying a right frame image, wherein each of the left frame pixels and the right frame pixels include hold capacitors and liquid crystal capacitors. The stereoscopic image display method includes storing a left frame image signal in the hold capacitors of the left frame pixels, transferring the left frame image signal, which is stored in the hold capacitors of the left frame pixels, to the liquid crystal capacitor of the left frame pixels in response to a transfer signal, storing a right frame image signal in the hold capacitors of the right frame pixels, and transferring the right frame image signal, which is stored in the hold capacitors of the right frame pixels, to the liquid crystal capacitor of the right frame pixels in response to the transfer signal.

According to another aspect, a stereoscopic image display device includes a display panel including a plurality of gate lines, a plurality of data lines which perpendicularly intersect the gate lines, and a plurality of pixels which are arranged in regions defined by the intersection of the gate lines and the data lines. A timing controller of the display device is configured to alternately output a left frame image signal and a right frame image signal, and output a plurality of first and second control signals. The display device further includes a data driver configured to drive the data lines in response to the left frame image signal, the right frame image signal, and the first control signals, and a gate driver configured to drive the gate lines and output a transfer signal in response to the second control signals. Each of the pixels of the display device includes a first transistor connected between a corresponding data line and a first node, and having a gate connected to a corresponding gate line. A hold capacitor connected between the first node and a ground voltage, a second transistor connected between the first node and a second node, and having a gate configured to receive the transfer signal, a storage capacitor connected between the second node and the ground voltage, and a liquid crystal capacitor connected between the second node and the ground voltage.

According to another aspect, a pixel circuit connected to a data line and a gate line is disclosed. The pixel circuit includes a first transistor connected between the data line and a first node, and having a gate connected to the gate line, a hold capacitor connected between the first node and a ground voltage, a second transistor connected between the first node and a second node, the second transistor having a gate configured to receive a transfer signal, a storage capacitor connected between the second node and the ground voltage, and a liquid crystal capacitor connected between the second node and the ground voltage.

BRIEF DESCRIPTION OF THE DRAWINGS

The accompanying drawings are included to provide further understanding of the inventive concepts, and are incorporated herein and constitute a part of this specification. The drawings illustrate exemplary embodiments of the inventive concepts and, together with the description, serve to explain principles of the inventive concepts. In the drawings.

DETAILED DESCRIPTION OF CERTAIN INVENTIVE EMBODIMENTS

Exemplary embodiments of the inventive concepts will be described below in more detail with reference to the accompanying drawings. The inventive concepts may, however, be embodied in different forms and should not be construed as limited to the embodiments set forth herein. Rather, these embodiments are provided so that this disclosure will be thorough and complete, and will fully convey the examples of the scope of the inventive concepts to those skilled in the art.

Figure 1:
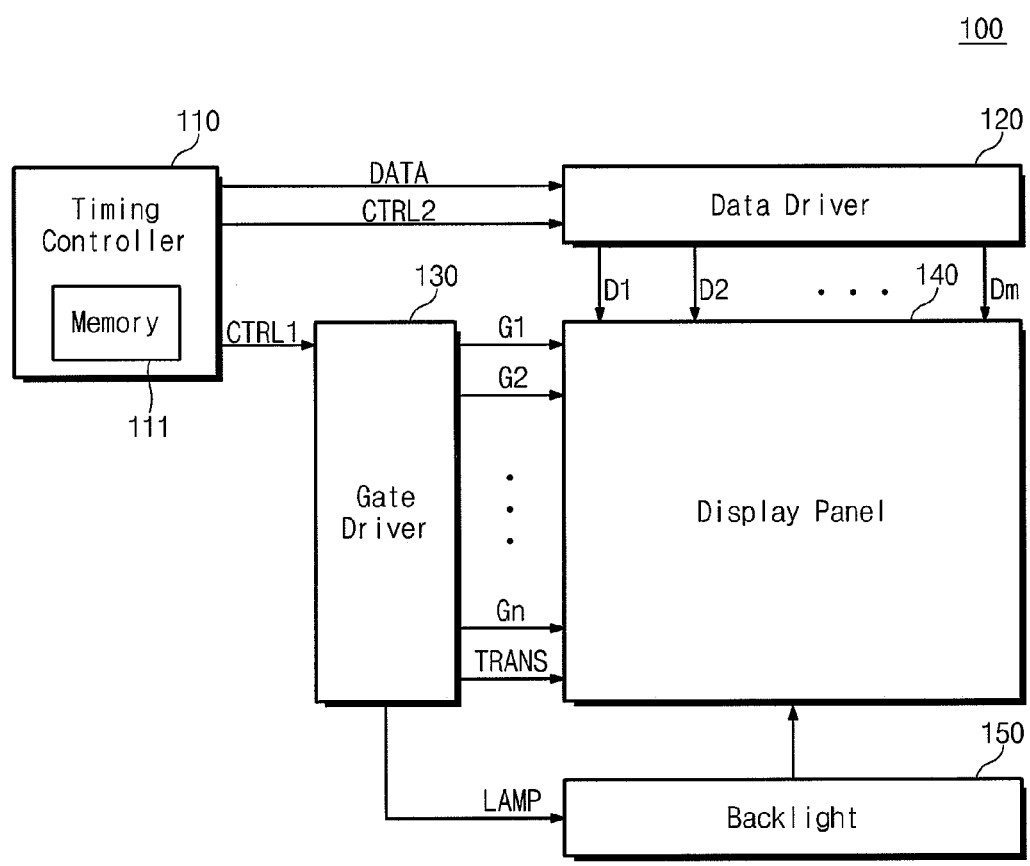
FIG. 1 is a block diagram illustrating a configuration of a stereoscopic image display device according to some embodiments.

FIG. 1 is a block diagram illustrating a configuration of a stereoscopic image display device according to some embodiments.

Referring to FIG. 1, a stereoscopic image display device 100 according to some embodiments includes a timing controller 110, a data driver 120, a gate driver 130, a display panel 140, and a backlight 150.

The display panel 140 includes a plurality of gate lines G1 to Gn, a plurality of data lines D1 to Dm that perpendicularly intersect the gate lines G1 to Gn, and a plurality of pixels that are respectively formed at intersection points between the gate lines and the data lines. The pixels are arranged in a matrix structure. The detailed configuration and operation of the display panel 140 will be described below in greater detail.

The timing controller 110 receives signals (for example, a vertical sync signal, a horizontal sync signal, a data enable signal, a clock signal, and a video signal) which are input from an external graphic source. The timing controller 110 outputs control signals CTRL2 and an image signal that has a format corresponding to the specification of the display panel 140, to the data driver 120. The control signals CTRL2, for example, include a horizontal sync start signal and a load signal. Additionally, the timing controller 110 outputs control signals CTRL1 to the gate driver 130 in response to the signals which are input from the external graphic source. The control signals CTRL1, for example, include a horizontal sync start signal, a gate clock signal, and an output enable signal.

An image signal DATA which is provided as an output from the timing controller 110 may be one of a left frame image signal corresponding to a left eye and a right frame image signal corresponding to a right eye. The timing controller 110 alternately and sequentially outputs the left frame image signal and the right frame image signal. The timing controller 110 includes a memory 111 configured to store the input left frame image signal and right frame image signal.

The data driver 120 generates signals for driving the data lines D1 to Dm of the display panel 140 in response to the image signal DATA and the control signals CTRL1 that are provided from the timing controller 110.

The gate driver 130 sequentially scans the gate lines G1 to Gn of the display panel 140 (i.e., a liquid crystal panel) according to the control signals CTRL2 that are provided from the timing controller 110. Throughout the description of various embodiments, scanning denotes that pixels connected to a gate line receiving a gate-on voltage are set to a state where data may be written by sequentially applying the gate-on voltage to the gate lines. The gate driver 130 outputs a transfer signal TRANS to the display panel 140.

The backlight 150 is a light source of the display panel 140, and is turned on/off according to a lamp control signal LAMP that is provided to the gate driver 130 by the gate driver 150.

Figure 2:
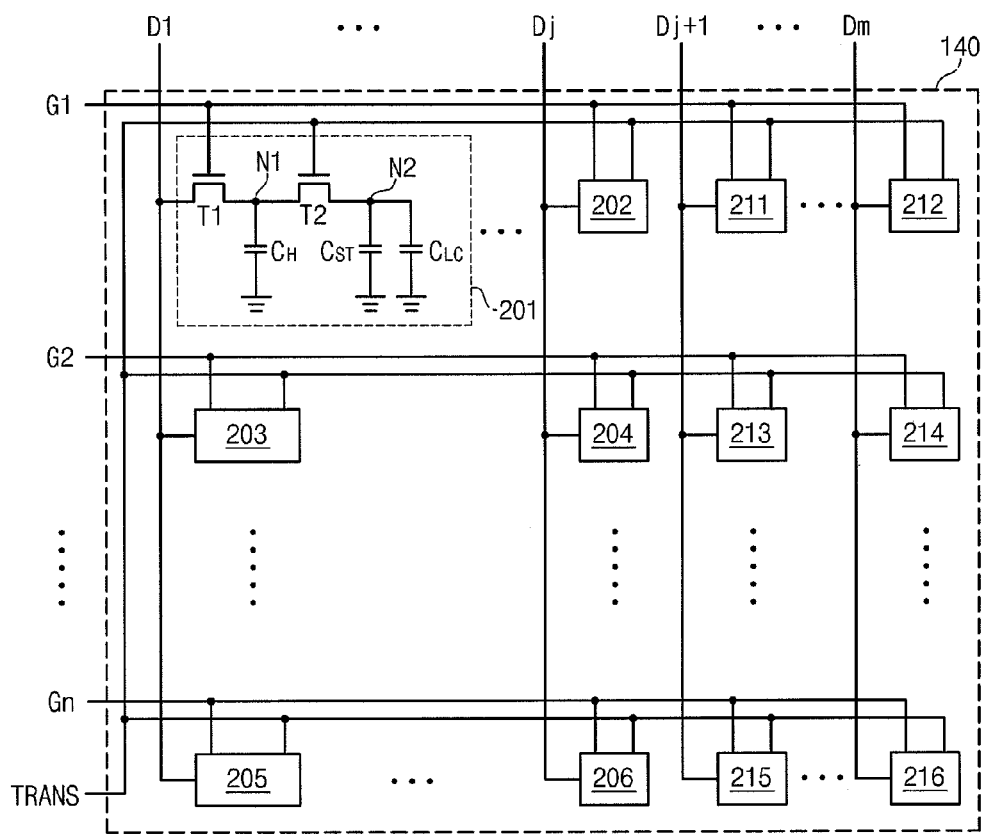
FIG. 2 is a block diagram illustrating a configuration of a display panel of FIG. 1, according to some embodiments.

FIG. 2 is a block diagram illustrating a configuration of the display panel of FIG. 1, according to some embodiments.

Referring to FIG. 2, the display panel 140 includes a plurality of gate lines G1 to Gn, a plurality of data lines D1 to Dm that perpendicularly intersect the gate lines G1 to Gn, and a plurality of pixels 201 to 206 and 211 to 216 that are arranged in regions defined by the intersection of gate lines G1 to Gn and the data lines D1 to Dm. The pixels 201 to 206 are left frame pixels for displaying a left frame image signal, and the pixels 211 to 216 are right frame pixels for displaying a right frame image signal.

The components of the left frame pixels 201 to 206 and right frame pixels 211 to 216 will now be described with reference to pixel 201 illustrated in FIG. 2. The left frame pixel 201 includes a first transistor T1, a second transistor T2, a hold capacitor $C_H$, a storage capacitor $C_{ST}$, and a liquid crystal capacitor $C_{LC}$. The first transistor T1 is connected between the data line D1 and the node N1, and has a gate connected to the gate line G1. The hold capacitor $C_H$ is connected between the node N1 and a ground voltage. The second transistor T2 is connected between nodes N1 and N2, and has a gate receiving the transfer signal TRANS. The storage capacitor $C_{ST}$ is connected between the node N2 and the ground voltage. The liquid crystal capacitor $C_{LC}$ is connected between the node N2 and the ground voltage. Alternatively, each of the hold capacitor $C_H$, the storage capacitor $C_{ST}$, and the liquid crystal capacitor $C_{LC}$ may be connected to a common voltage rather than the ground voltage. The other left frame pixels 202 to 206 and the right frame pixels 211 to 216 have similar configuration to that described with respect to pixel 201.

The operation of the display panel 140 having a configuration described with reference to FIG. 2 will be described below with reference to FIG. 3.

Figure 3:
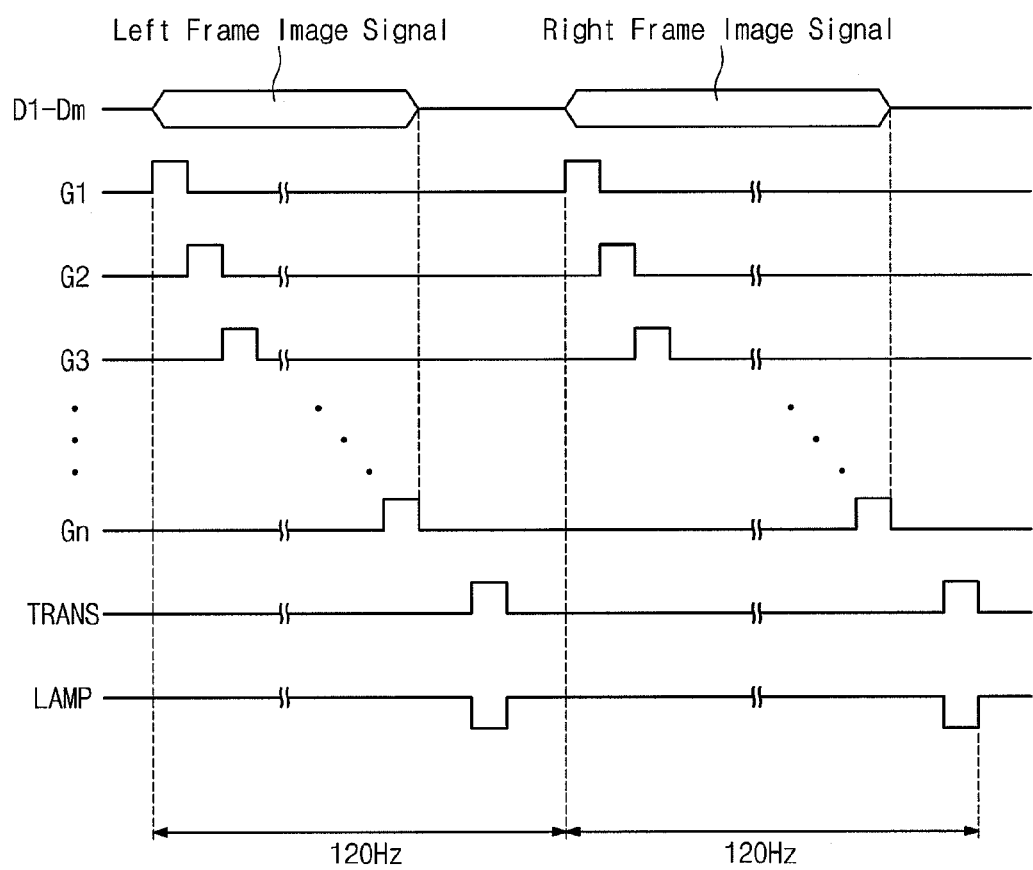
FIG. 3 is a timing diagram illustrating signals for driving the display panel of FIG. 2.

FIG. 3 is a timing diagram illustrating signals for driving the display panel of FIG. 2.

With reference to FIGS. 2 and 3, a left frame image signal is first output from the timing controller 110 through data lines D1-Dj. When the gate line G1 is turned on, the first transistor T1 of each of the pixels 201 and 202 is turned on, and the left frame image signal is stored in the hold capacitor $C_H$ through the data line D1 through Dj. As the gate lines G1 to Gn are sequentially turned on, the hold capacitors $C_H$ of the respective left frame pixels 201 to 206 sequentially store a voltage corresponding to outputting a left frame image signal by each of the pixels 201 to 206.

As discussed above, the gate lines G1 to Gn are sequentially driven. A transfer signal TRANS is initiated at a predetermined position following the output of the left frame image signal. As illustrated in FIG. 3, the transfer signal TRANS is activated to a high level, the second transistors T2 of the respective left frame pixels 201 to 206 are turned on and the left frame image signal stored in the hold capacitors $C_H$ is transferred to the storage capacitors $C_{ST}$ and the liquid crystal capacitors $C_{LC}$. As a result, the left frame pixels 201 to 206 display a left frame image.

When a right frame image signal is outputted from the timing controller 110, as the gate lines G1 to Gn are sequentially turned on, the hold capacitors $C_H$ of the respective right frame pixels 211 to 216 sequentially store a right frame image signal.

Similarly, a right frame image signal is output from the timing controller 110 through data lines Dj+1 through Dm. When the gate line G1 is turned on, the first transistor T1 of each of the pixels 211 and 212 is turned on, and the right frame image signal is stored in the hold capacitor $C_H$ through the data lines Dj+1 through Dm. As the gate lines G1 to Gn are sequentially turned on, the hold capacitors $C_H$ of the respective right frame pixels 211 to 216 sequentially store a voltage corresponding to outputting a right frame image signal by each of the pixels 211 to 216.

As discussed above, the gate lines G1 to Gn are sequentially driven to drive the right frame pixels. A transfer signal TRANS is initiated at a predetermined time following the output of the right frame image signal. When the transfer signal TRANS is activated to a high level, the second transistors T2 of the respective right frame pixels 211 to 216 are turned on, and the right frame image signal stored in the hold capacitors $C_H$ is transferred to the storage capacitors $C_{ST}$ and the liquid crystal capacitors $C_{LC}$. As a result, the right frame pixels 211 to 216 display a right frame image.

With this driving method, the left frame pixels 201 to 206 are configured to display the left frame image signal while the right frame image signal is stored in the hold capacitors $C_H$ of the respective right frame pixels 211 to 216. Similarly, while the right frame pixels 211 to 216 display the right frame image signal, the left frame image signal is stored in the hold capacitors $C_H$ of the respective left frame pixels 201 to 206.

Figure 4:
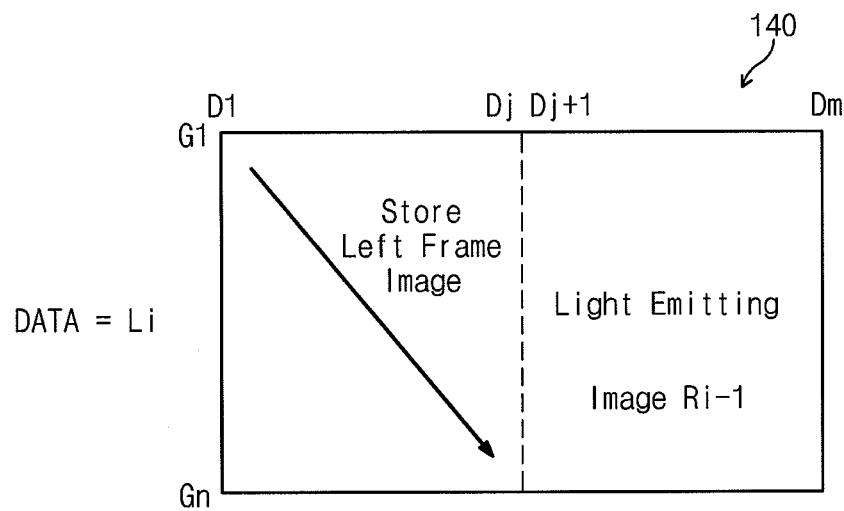
FIG. 4 is a diagram conceptually illustrating an operation state of left frame pixels and right frame pixels of the display panel.
Figure 4:
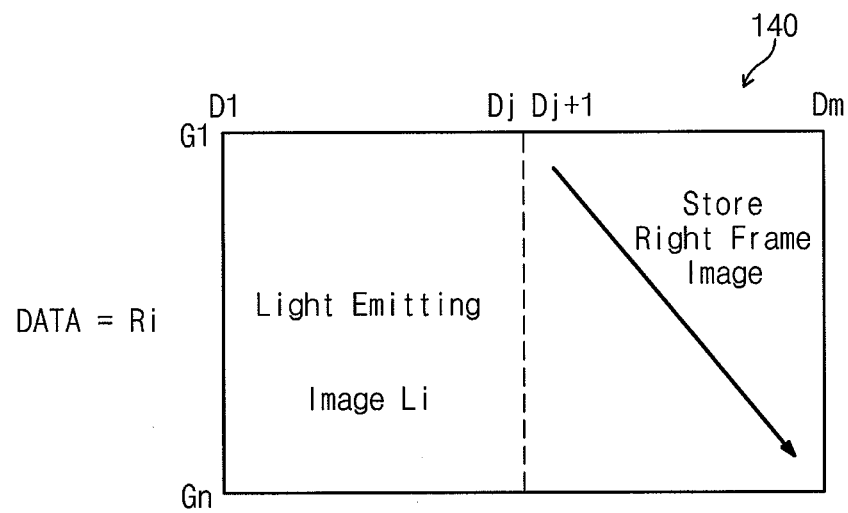

FIG. 4 is a diagram conceptually illustrating an operation state of the left frame pixels and right frame pixels of the display panel.

With reference to FIG. 4, when a left frame image signal $L_i$ of an ith frame is output from the timing controller 110, the right frame pixels 211 to 216 display a right frame image signal ($R_{i-1}$) of an i−1st frame while the left frame pixels 201 to 206 store the left frame image signal Li. When a right frame image signal $R_i$ of the ith frame is outputted from the timing controller 110, the left frame pixels 201 to 206 display the left frame image signal $L_i$ of the ith frame while the right frame pixels 211 to 216 store the right frame image signal $R_i$.

Since the timing controller 110 alternately and sequentially outputs a left frame image signal and a right frame image signal, the display panel 150 may alternately display the left frame image signal and the right frame image signal. Crosstalk in the area that a left frame image overlaps with a right frame image may occur due to the response time of the liquid crystal capacitors of the display panel 140 and a time taken for providing an input image signal to the display panel 140. To prevent the crosstalk, the gate driver 130 of FIG. 1 may be configured to output a lamp control signal LAMP to the backlight 150.

With returned reference to FIG. 3, when the transfer signal TRANS is activated to a high level, the lamp control signal LAMP is deactivated to a low level. As a result, the left frame pixels 201 to 206 store the left frame image signal, the right frame pixels 211 to 216 display the right frame image signal ($R_{i-1}$) of the i−1st frame. Subsequently, the backlight 150 is turned off. Similarly, the left frame pixels 201 to 206 display the left frame image signal $L_i$ of the ith frame, the right frame pixels 211 to 216 store the right frame image signal $R_i$, and thereafter the backlight 150 is turned off.

According to the above-described embodiment of the inventive concept, black images are not output by the left frame pixels 201 to 206 and the right frame pixels 211 to 216. As a result, a left frame image and a right frame image can be displayed at approximately 120 Hz. Furthermore, the black images are not output while the left frame image and the right frame image are displayed by the display, and thus a decrease in brightness of an image displayed on the display panel 140 can be minimized.

With returned reference to FIG. 2, when the second transistor T2 is turned on, charge sharing with the hold capacitor $C_H$ may be achieved through the left electric charge of the storage capacitor $C_{ST}$ and the left electric charge of the liquid crystal capacitor $C_{LC}$. Since an image signal (data[i−1]) of a previous frame affects an image signal (data[i]) of a current frame, the image signal of the current frame may be distorted. As a result, a voltage affecting the image signal (data[i]) of the current frame is dependent on the capacitance of the hold capacitor $C_H$, the capacitance of the storage capacitor $C_{ST}$, and the capacitance of the liquid crystal capacitor $C_{LC}$. For example, when a ratio of the capacitance of the hold capacitor $C_H$ to the sum of the capacitances of the storage capacitor $C_{ST}$ and liquid crystal capacitor $C_{LC}$ is 2:1, an effective voltage (Veff) affecting the image signal (data[i]) of the current frame is expressed by Equation (1).

$$Veff=(2*data[i]+data[i-1])/3 \quad (1)$$

Therefore, the image signal (data[i]) of the current frame may be corrected on the basis of the image signal (data[i−1]) of the previous frame.

When the image signal (data[i]) of the current frame is received, the timing controller 110 of FIG. 1 corrects the image signal (data[i]) of the current frame by the effective voltage on the basis of the image signal (data[i−1]) of the previous frame stored in the memory 111, and provides the corrected image signal DATA to the data driver 120. The timing controller 110 stores the corrected image signal DATA in the memory 111. A relationship between the image signal (data[i−1]) of the previous frame and the corrected image signal based on the image signal (data[i]) of the current frame may be stored as a look-up table in the timing controller 110.

Figure 5:
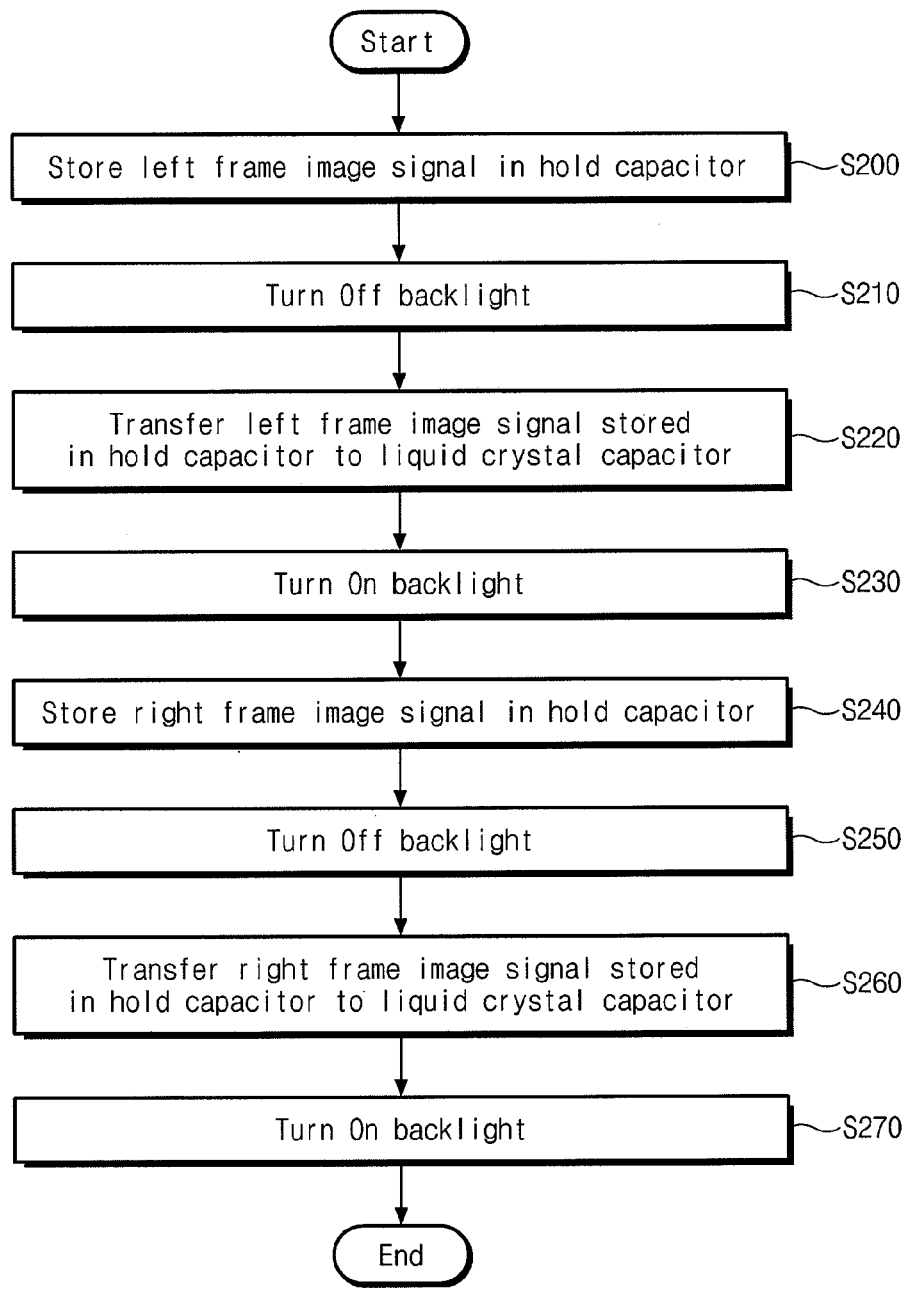
FIG. 5 is a flowchart illustrating a stereoscopic image display method of a stereoscopic image display device in FIGS. 1 and 2, according to some embodiments.

FIG. 5 is a flowchart illustrating a stereoscopic image display method of a stereoscopic image display device in FIGS. 1 and 2, according to some embodiments.

With reference to FIG. 5, as the gate lines G1 to Gn are scanned, left frame image signals input through the data lines D1 to Dj are stored in the hold capacitors $C_H$ of the left frame pixels 201 to 206, respectively in operation S200.

In operation 5210, when scanning of the gate lines G1 to Gn is completed, the lamp control signal LAMP is deactivated, and the backlight 150 is turned off.

In operation S220, when the backlight 150 is in an off state, a transfer signal TRANS is activated. Each of the left frame image signals stored in the hold capacitors $C_H$ of the left frame pixels 201 to 206 is transferred to a corresponding storage capacitor $C_{ST}$ and a corresponding liquid crystal capacitor $C_{LC}$.

In operation S230, the backlight 150 is again turned on. As a result, a left frame image is displayed by the left frame pixels 201 to 206.

While the left frame image is being displayed by the left frame pixels 201 to 206, as the gate lines G1 to Gn are scanned, right frame image signals input through the data lines $D_{j+1}$ to $D_m$ are stored in the hold capacitors $C_H$ of the right frame pixels 211 to 216, respectively in operation S240.

In operation S250, when scanning of the gate lines G1 to Gn is completed, the lamp control signal LAMP is deactivated, and the backlight 150 is turned off.

In operation S260, when the backlight 150 is in an off state, and as the transfer signal TRANS is activated, each of the right frame image signals stored in the hold capacitors $C_H$ of the right frame pixels 211 to 216 is transferred to a corresponding storage capacitor $C_{ST}$ and a corresponding liquid crystal capacitor $C_{LC}$.

In operation S270, the backlight 150 is again turned on. As a result, a right frame image is displayed by the right frame pixels 211 to 216.

In the above-described method, a left frame image and a right frame image that are included in one frame are sequentially displayed on the display panel 140. A left frame image and right frame image of a next frame are repeatedly displayed on the display panel 140 in the stereoscopic image display method of FIG. 5.

Figure 6:
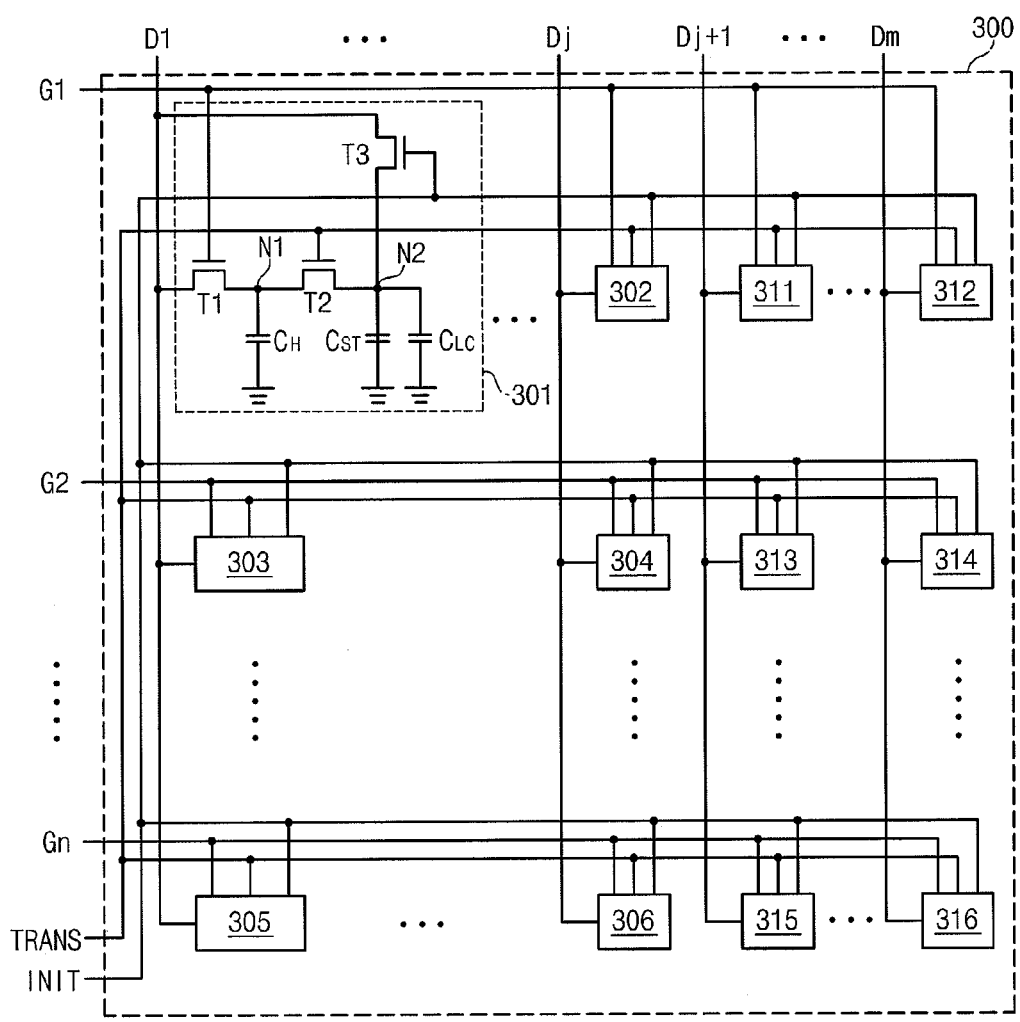
FIG. 6 a diagram illustrating a display panel according to some embodiments.

FIG. 6 a diagram illustrating a display panel according to some embodiments.

A display panel 300 in FIG. 6 includes a plurality of pixels 301 to 306 and 311 to 316 similar to the display panel 140 illustrated in FIG. 2. The pixel 301 includes a first transistor T1, a second transistor T2, a hold capacitor $C_H$, a storage capacitor $C_{ST}$, a liquid crystal capacitor $C_{LC}$, and a third transistor T3. The third transistor T3 is connected between a data line D and a node N2, and has a gate receiving an initialization signal INIT.

Figure 7:
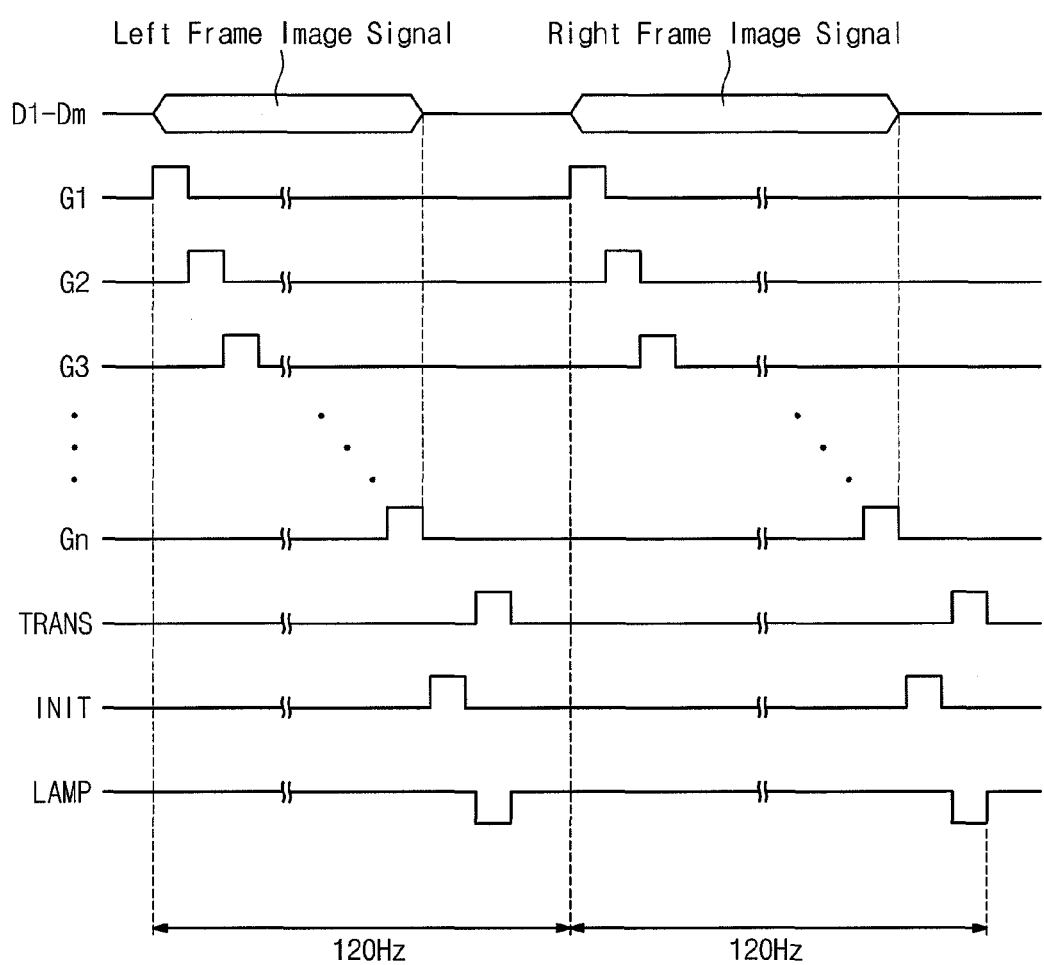
FIG. 7 is a timing diagram illustrating signals for driving the display panel of FIG. 6.

FIG. 7 is a timing diagram illustrating signals for driving the display panel 300 of FIG. 6.

With reference to FIGS. 6 and 7, the initialization signal INIT is activated before a transfer signal TRANS is activated. At this point, the timing controller 110 of FIG. 1 outputs an image signal (for example, a common voltage Vcom) for initializing the storage capacitor $C_{ST}$ and the liquid crystal capacitor $C_{LC}$. The storage capacitor $C_{ST}$ and the liquid crystal capacitor $C_{LC}$ are initialized before an image signal stored in the hold capacitor $C_H$ is transferred to the storage capacitor $C_{ST}$ and the liquid crystal capacitor $C_{LC}$. Therefore, the image signal of a previous frame can prevent the image signal of a current frame from being distorted due to the left electric charge of the storage capacitor $C_{ST}$ and the left electric charge of the liquid crystal capacitor $C_{LC}$.

According to the embodiments of the inventive concept, the stereoscopic image display device displays a high-quality stereoscopic image at a low driving speed. Furthermore, since the stereoscopic image display device does not separately output a black image, the quality of an image displayed by the stereoscopic image display device is enhanced.

According to some embodiments a stereoscopic image display method of a display device is disclosed. The stereoscopic display method includes a plurality of left frame pixels, which include hold capacitors and liquid crystal capacitors for displaying a left frame image and a plurality of right frame pixels which include hold capacitors and liquid crystal capacitors, for displaying a right frame image. The method includes storing a left frame image signal in the hold capacitors of the left frame pixels; transferring the left frame image signal, which is stored in the hold capacitors of the left frame pixels, to the liquid crystal capacitor of the left frame pixels in response to a transfer signal; storing a right frame image signal in the hold capacitors of the right frame pixels, and transferring the right frame image signal, which is stored in the hold capacitors of the right frame pixels, to the liquid crystal capacitor of the right frame pixels in response to the transfer signal.

In some embodiments, the display device may further includes a backlight. The stereoscopic image display method may further include performing controlling the backlight such that it is set to an off state when the transfer signal is activated.

In other embodiments, each of the left frame pixels and the right frame pixels may further include a storage capacitor. The right frame pixels may display the right frame image signal while the left frame image signal is stored in the hold capacitors of the left frame pixels, and the left frame pixels may display the left frame image signal while the right frame image signal is stored in the hold capacitors of the right frame pixels.

According to some embodiments, the stereoscopic image display method may further include: receiving a current left frame image signal; correcting the current left frame image signal on the basis of a previous left frame image signal stored in a memory, outputting the corrected current left frame image signal as the left frame image signal, and storing the corrected current left frame image signal in the memory.

According to some embodiments, the correcting of the current left frame image signal may correct the current left frame image signal on the basis of a capacitance rate of the hold capacitor, liquid crystal capacitor and storage capacitor.

The stereoscopic image display method may further include: receiving a current right frame image signal, correcting the current right frame image signal on the basis of a previous right frame image signal stored in a memory, outputting the corrected current right frame image signal as the right frame image signal, and storing the current right frame image signal in the memory.

The stereoscopic image display method may further include transferring refresh data to the liquid crystal capacitor before transferring the left frame image signal to the liquid crystal capacitor.

According to some embodiments, the left frame image signal and the right frame image signal may configure display of one image frame, and the left frame image signal and the right frame image signal may be alternately transferred to the display device.

According to some embodiments, a stereoscopic image display device includes: a display panel including a plurality of gate lines, a plurality of data lines which perpendicularly intersect the gate lines, and a plurality of pixels which are arranged in regions defined by the intersection of gate lines and the data lines. A timing controller alternately outputting a left frame image signal and a right frame image signal, and outputting a plurality of first and second control signals, a data driver configured to drive the data lines in response to the left frame image signal, the right frame image signal and the first control signals. The display device further includes a gate driver configured to drive the gate lines and output a transfer signal in response to the second control signals, wherein each of the pixels includes: a first transistor connected between a corresponding data line and a first node, and having a gate connected to a corresponding gate line, a hold capacitor connected between the first node and a ground voltage, a second transistor connected between the first node and a second node, and having a gate receiving the transfer signal, a storage capacitor connected between the second node and the ground voltage, and a liquid crystal capacitor connected between the second node and the ground voltage.

In some embodiments, the pixels may include a plurality of left frame pixels for displaying a left frame image, and a plurality of right frame pixels for displaying a right frame image, each of the hold capacitors of the left frame pixels may store the left frame image signal input through the first transistor when the data lines are driven to the left frame image signal, and each of the hold capacitors of the right frame pixels may store the right frame image signal input through the first transistor when the data lines are driven to the right frame image signal.

In other embodiments, the pixels may include a plurality of left frame pixels for displaying a left frame image, and a plurality of right frame pixels for displaying a right frame image, each of the hold capacitors of the left frame pixels may store the left frame image signal input through the first transistor when the data lines are driven to provide data corresponding to the left frame image signal, and each of the hold capacitors of the right frame pixels may store the right frame image signal input through the first transistor when the data lines are driven to provide data corresponding to the right frame image signal.

The right frame pixels may display the right frame image signal while the left frame image signal is stored in the hold capacitors of the left frame pixels, and the left frame pixels may display the left frame image signal while the right frame image signal is stored in the hold capacitors of the right frame pixels.

The timing controller may include a memory configured to store the left frame image signal and the right frame image signal, and the timing controller may correct a current left frame image signal and a current right frame image signal on the basis of a previous left frame image signal and a previous right frame image signal which are stored in the memory. The timing controller may be further configured to provide the corrected left frame image signal and the corrected right frame image signal to the data driver.

According to some embodiments, the stereoscopic image display device may further include a backlight. The gate driver may output a lamp control signal for controlling the backlight such that it is in an off state when the transfer signal is activated.

Each of the pixels may further include a third transistor connected between the corresponding data line and the second node, and having a gate receiving an initialization signal. Each of the gate lines may be driven, and then the initialization signal may be activated prior to the transfer signal.

According to some embodiments, a pixel circuit, which is connected to a data line and a gate line, includes: a first transistor connected between the data line and a first node, and having a gate connected to the gate line. The pixel circuit includes a hold capacitor connected between the first node and a ground voltage, a second transistor connected between the first node and a second node, and having a gate receiving a transfer signal. The pixel circuit further includes a storage capacitor connected between the second node and the ground voltage; and a liquid crystal capacitor connected between the second node and the ground voltage.

In some embodiments, the pixel circuit may further include a third transistor connected between the data line and the second node, and having a gate receiving an initialization signal. The initialization signal may be activated prior to the transfer signal.

The above-disclosed subject matter is to be considered illustrative and not restrictive, and the appended claims are intended to cover all such modifications, enhancements, and other embodiments, which fall within the true spirit and scope of the inventive concept. Thus, the scope of the inventive concept is to be determined by the through the scope of the appended claims and their equivalents, and shall not be restricted or limited by the foregoing detailed description.

What is claimed is:

1. A stereoscopic image display method of a display device, which includes a plurality of left frame pixels for displaying a left frame image and a plurality of right frame pixels for displaying a right frame image, wherein each of the left frame pixels and the right frame pixels include hold capacitors and liquid crystal capacitors, the stereoscopic image display method comprising:
receiving a current left frame image signal;
correcting the current left frame image signal on the basis of a capacitance rate of the hold capacitor, liquid crystal capacitor, and storage capacitor of the left frame pixel;
outputting a corrected current left frame image signal as a left frame image signal; and
storing the corrected current left frame image signal in a memory;
storing the left frame image signal in the hold capacitors of the left frame pixels, wherein each of the left frame pixels and the right frame pixels further comprise a storage capacitor, and wherein the right frame pixels display the right frame image signal while the left frame image signal is stored in the hold capacitors of the left frame pixels, and the left frame pixels display the left frame image signal while the right frame image signal is stored in the hold capacitors of the right frame pixels;
transferring the left frame image signal, which is stored in the hold capacitors of the left frame pixels, to the liquid crystal capacitor of the left frame pixels in response to a transfer signal;
storing a right frame image signal in the hold capacitors of the right frame pixels; and
transferring the right frame image signal, which is stored in the hold capacitors of the right frame pixels, to the liquid crystal capacitor of the right frame pixels in response to the transfer signal.

2. The stereoscopic image display method of claim 1, wherein the display device further comprises a backlight, and wherein the stereoscopic image display method further comprises setting the backlight to an off state when the transfer signal is activated.

3. The stereoscopic image display method of claim 1, further comprising:
receiving a current right frame image signal;
correcting the current right frame image signal on the basis of a previous right frame image signal stored in memory;
outputting a corrected current right frame image signal as the right frame image signal; and
storing the current right frame image signal in the memory.

4. The stereoscopic image display method of claim 1, further comprising transferring refresh data to the liquid crystal capacitor prior to transferring the left frame image signal to the liquid crystal capacitor.

5. The stereoscopic image display method of claim 1, wherein:
the left frame image signal and the right frame image signal correspond to a single frame, and
the left frame image signal and the right frame image signal are alternately transferred to the display device.

6. A stereoscopic image display device comprising:
a display panel comprising a plurality of gate lines, a plurality of data lines which perpendicularly intersect the gate lines, and a plurality of pixels which are arranged in regions defined by the intersection of the gate lines and the data lines;
a timing controller configured to alternately output a left frame image signal and a right frame image signal, and output a plurality of first and second control signals;
a data driver configured to drive the data lines in response to the left frame image signal, the right frame image signal, and the first control signals; and
a gate driver configured to drive the gate lines and output a transfer signal in response to the second control signals,
wherein each of the pixels comprises:
a first transistor connected between a corresponding data line and a first node, and having a gate connected to a corresponding gate line;
a hold capacitor connected between the first node and a ground voltage;
a second transistor connected between the first node and a second node, and having a gate configured to receive the transfer signal;
a storage capacitor connected between the second node and the ground voltage; and
a liquid crystal capacitor connected between the second node and the ground voltage.

7. The stereoscopic image display device of claim 6, wherein the pixels comprise a plurality of left frame pixels for displaying a left frame image, and a plurality of right frame pixels for displaying a right frame image, and wherein each of the hold capacitors of the left frame pixels stores the left frame image signal input through the first transistor when the data lines are driven to provide the left frame image signal, and each of the hold capacitors of the right frame pixels stores the right frame image signal input through the first transistor when the data lines are driven to provide the right frame image signal.

8. The stereoscopic image display device of claim 7, wherein the right frame pixels display the right frame image signal while the left frame image signal is stored in the hold capacitors of the left frame pixels, and the left frame pixels display the left frame image signal while the right frame image signal is stored in the hold capacitors of the right frame pixels.

9. The stereoscopic image display device of claim 8, wherein:
- the timing controller comprises a memory configured to store the left frame image signal and the right frame image signal, and
- the timing controller corrects a current left frame image signal and a current right frame image signal on the basis of a previous left frame image signal and a previous right frame image signal which are stored in the memory, and provides the corrected left frame image signal and the corrected right frame image signal to the data driver.

10. The stereoscopic image display device of claim 6, further comprising a backlight, wherein the gate driver outputs a lamp control signal configured to set the backlight to an off state when the transfer signal is activated.

11. The stereoscopic image display device of claim 6, wherein each of the pixels further comprises a third transistor connected between the corresponding data line and the second node, and having a gate receiving an initialization signal.

12. The stereoscopic image display device of claim 11, wherein each of the gate lines are driven, and an initialization signal is activated prior to the transfer signal.

13. A pixel circuit connected to a data line and a gate line, the pixel circuit comprising:
- a first transistor connected between the data line and a first node, and having a gate connected to the gate line;
- a hold capacitor connected between the first node and a ground voltage;
- a second transistor connected between the first node and a second node, the second transistor having a gate configured to receive a transfer signal;
- a storage capacitor connected between the second node and the ground voltage;
- a liquid crystal capacitor connected between the second node and the ground voltage.

14. The pixel circuit of claim 13, further comprising a third transistor connected between the data line and the second node, and having a gate receiving an initialization signal.

15. The pixel circuit of claim 14, wherein the initialization signal is activated prior to the transfer signal.

* * * * *